US008182900B2

(12) United States Patent
Lee et al.

(10) Patent No.: US 8,182,900 B2
(45) Date of Patent: *May 22, 2012

(54) INJECTION MOLDED PRODUCT

(75) Inventors: Moon-Hee Lee, Daegu (KR); Jong-Man Park, Goomi-si (KR)

(73) Assignee: LG Electronics Inc., Seoul (KR)

( * ) Notice: Subject to any disclaimer, the term of this patent is extended or adjusted under 35 U.S.C. 154(b) by 392 days.

This patent is subject to a terminal disclaimer.

(21) Appl. No.: 12/441,953

(22) PCT Filed: Sep. 5, 2007

(86) PCT No.: PCT/KR2007/004283

§ 371 (c)(1), (2), (4) Date: Mar. 19, 2009

(87) PCT Pub. No.: WO2008/035870

PCT Pub. Date: Mar. 27, 2008

(65) Prior Publication Data

US 2010/0086740 A1 Apr. 8, 2010

(30) Foreign Application Priority Data

Sep. 20, 2006 (KR) ........................ 10-2006-0091095

(51) Int. Cl.
*B32B 3/00* (2006.01)
*B29B 7/00* (2006.01)

(52) U.S. Cl. ........ 428/156; 428/141; 428/167; 428/212; 264/328.1

(58) Field of Classification Search .................... 428/38, 428/141, 156, 167, 212, 409, 912.1; 264/328.1
See application file for complete search history.

(56) References Cited

U.S. PATENT DOCUMENTS 5,840,407 A * 11/1998 Futhey et al. ................. 428/167
6,077,472 A 6/2000 Kataoka et al.
6,432,332 B1 8/2002 Matsco et al. .................. 264/39
6,770,348 B2 8/2004 Lee .............................. 428/66.5
2003/0183961 A1 10/2003 Masuda et al. ................. 264/2.5
2005/0260349 A1 11/2005 Pawlowski et al. ........... 427/282

FOREIGN PATENT DOCUMENTS

DE 44 29 625 A1 2/1996
EP 1 588 989 A2 10/2005
GB 2 421 212 B 1/2008
JP 11-179736 7/1999
JP 11-245233 9/1999
JP 2004-054218 A 2/2004
JP 2007-160637 A 6/2007
KR 2003-0074969 9/2003

(Continued)

OTHER PUBLICATIONS

International Search Report dated Dec. 14, 2007.

(Continued)

*Primary Examiner* — Donald J Loney
(74) *Attorney, Agent, or Firm* — Ked & Associates LLP

(57) ABSTRACT

An injection molded product is provided that does not require any separate processes after the injection molding and has beautiful patterns on a surface thereof. The injection molded product includes an irregular prominent surface on which irregular prominences are formed, a regular prominent surface formed having fan-shaped minute protrusions, and a pattern formed by a difference of a regularity between the irregular prominent surface and the regular prominent surface.

10 Claims, 8 Drawing Sheets

150
ss
a
g
su
ss
ct
s
t

FOREIGN PATENT DOCUMENTS

WO WO 95/13910 A1 5/1995

OTHER PUBLICATIONS

PCT International Search Report dated Dec. 14, 2007 issued in Application No. PCT/KR2007/004284.

U.S. Office Action dated May 26, 2011 issued in U.S. Appl. No. 12/441,962.

European Search Report dated Mar. 7, 2011 issued in Application No. 07 80 8077.

European Search Report dated Mar. 7, 2011 issued in Application No. 07 80 8078.

Chinese Office Action dated Mar. 21, 2011 issued in Application No. 200780035060.5 (with translation).

Chinese Office Action dated Mar. 21, 2011 issued in Application No. 200780035063.9 (with translation).

U.S. Office Action issued in U.S. Appl. No. 12/441,962 dated Jan. 10, 2012.

* cited by examiner

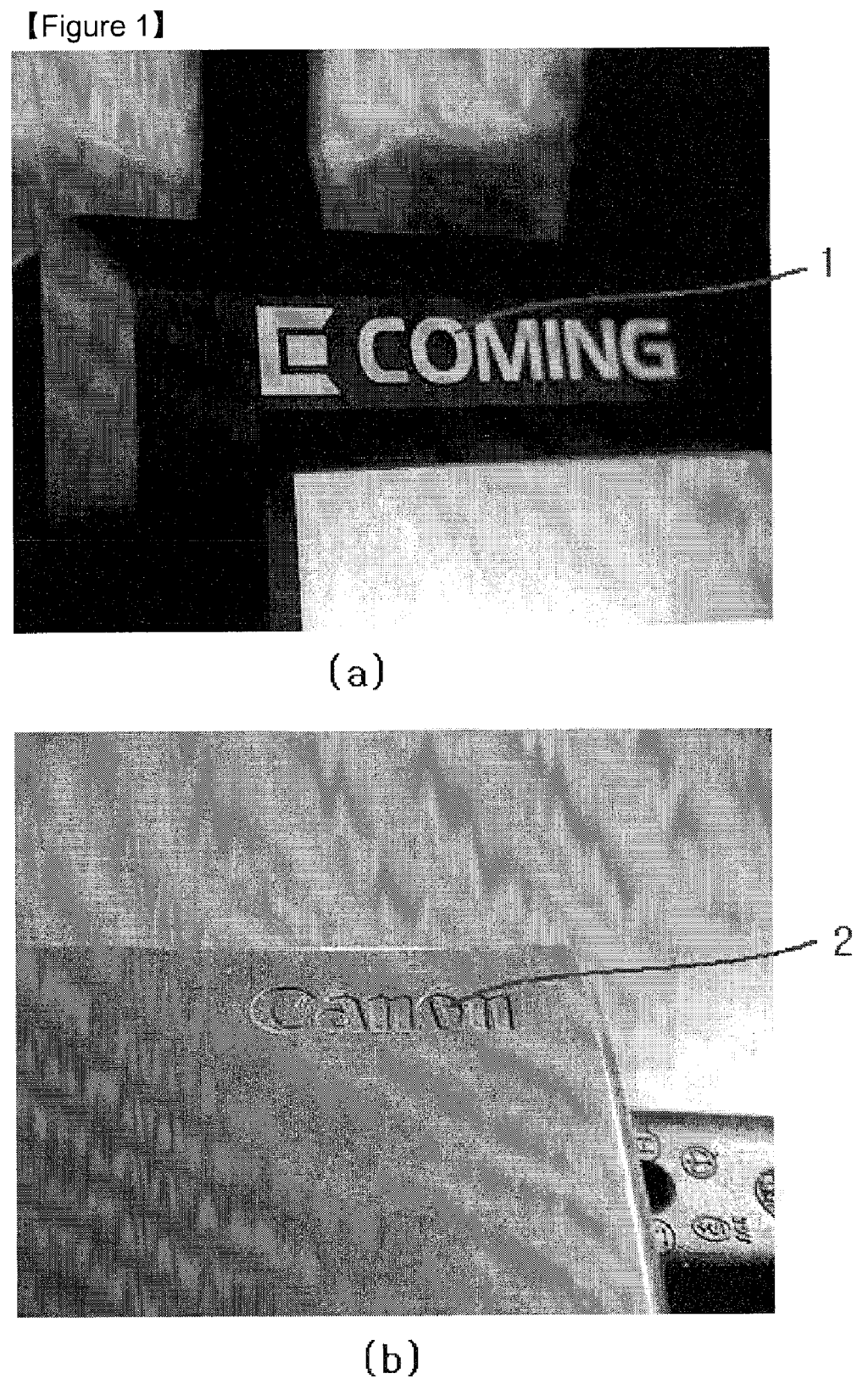

【Figure 2】
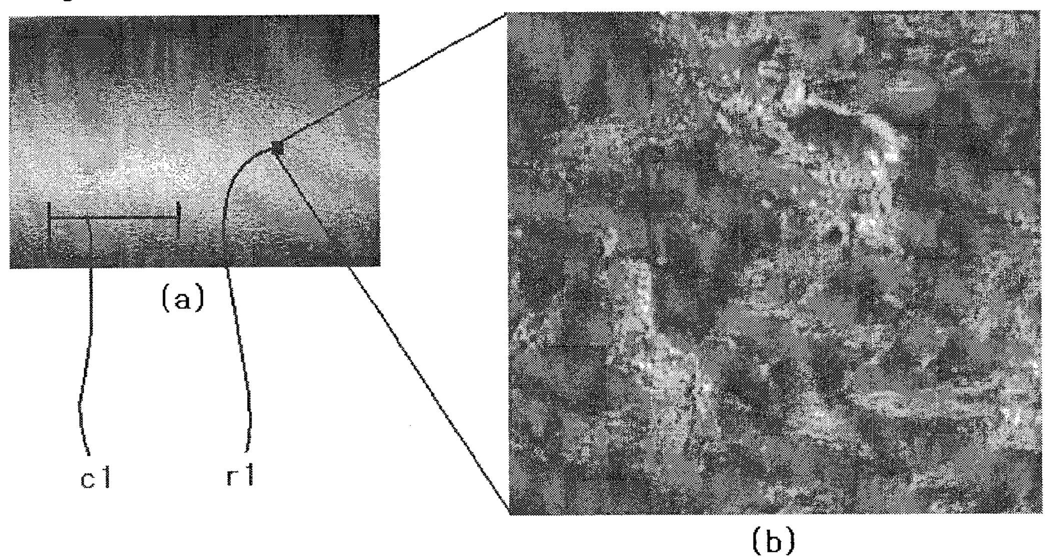
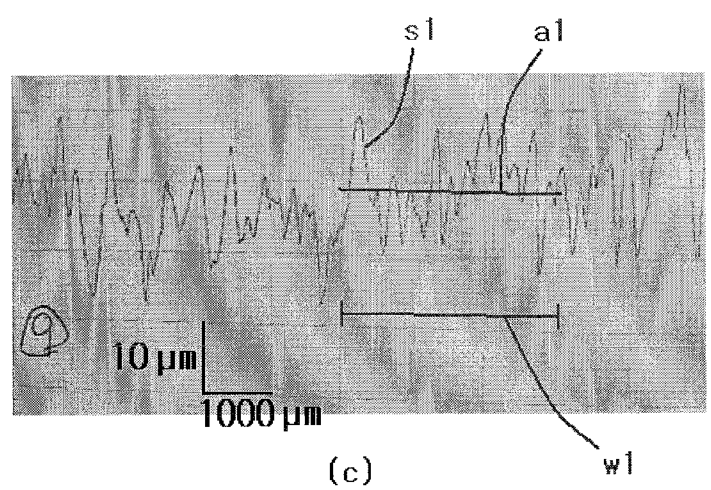

【Figure 3】
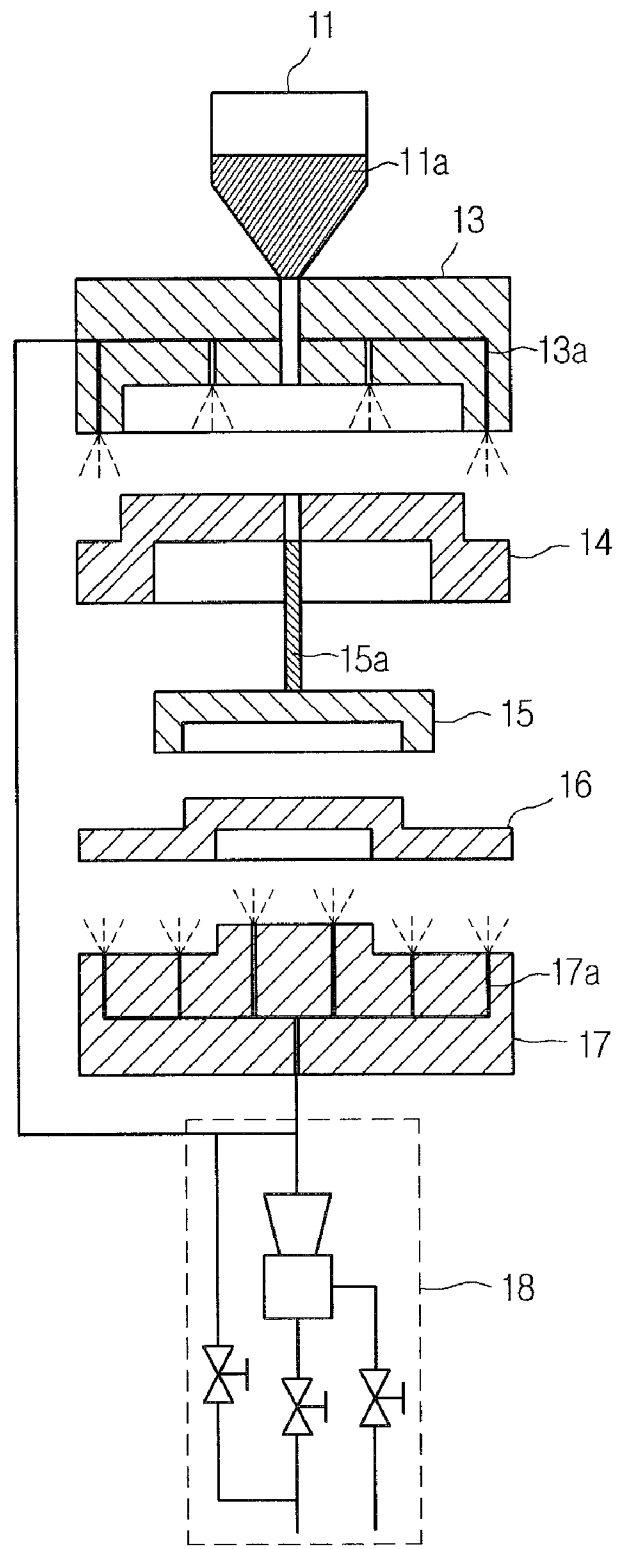

【Figure 4】
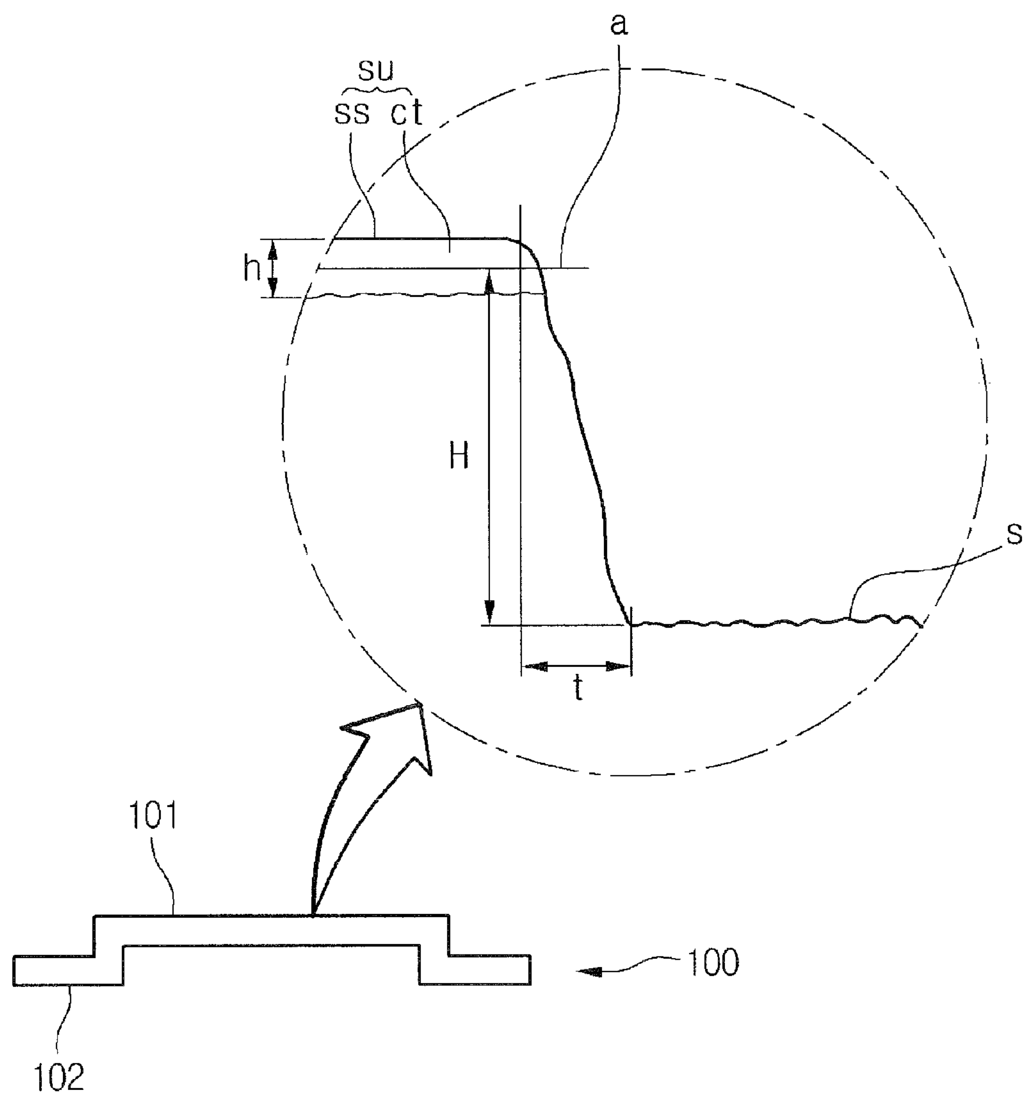

【Figure 5】
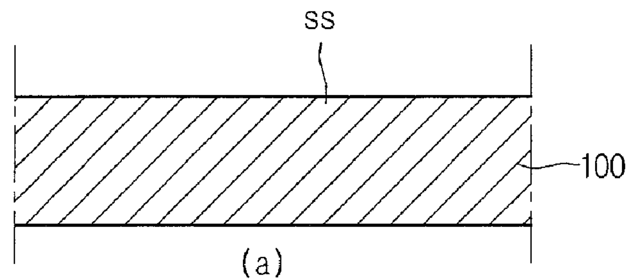
(a)
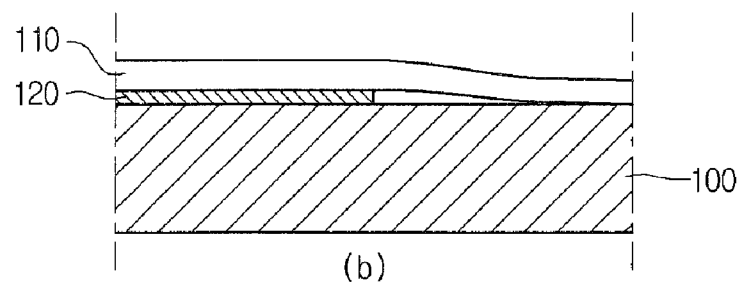
(b)
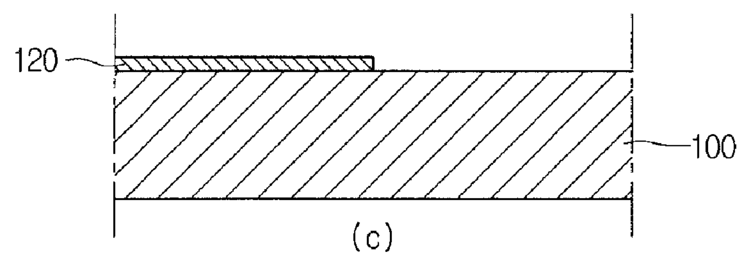
(c)
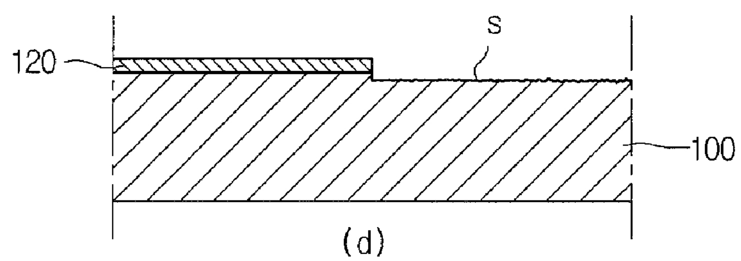
(d)
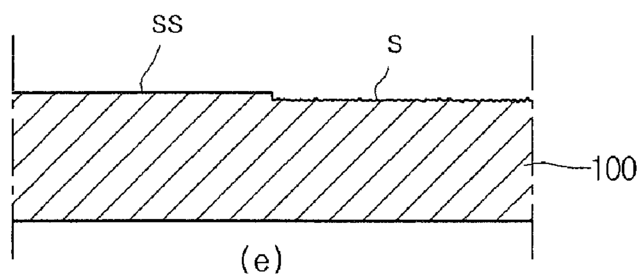
(e)

【Figure 6】
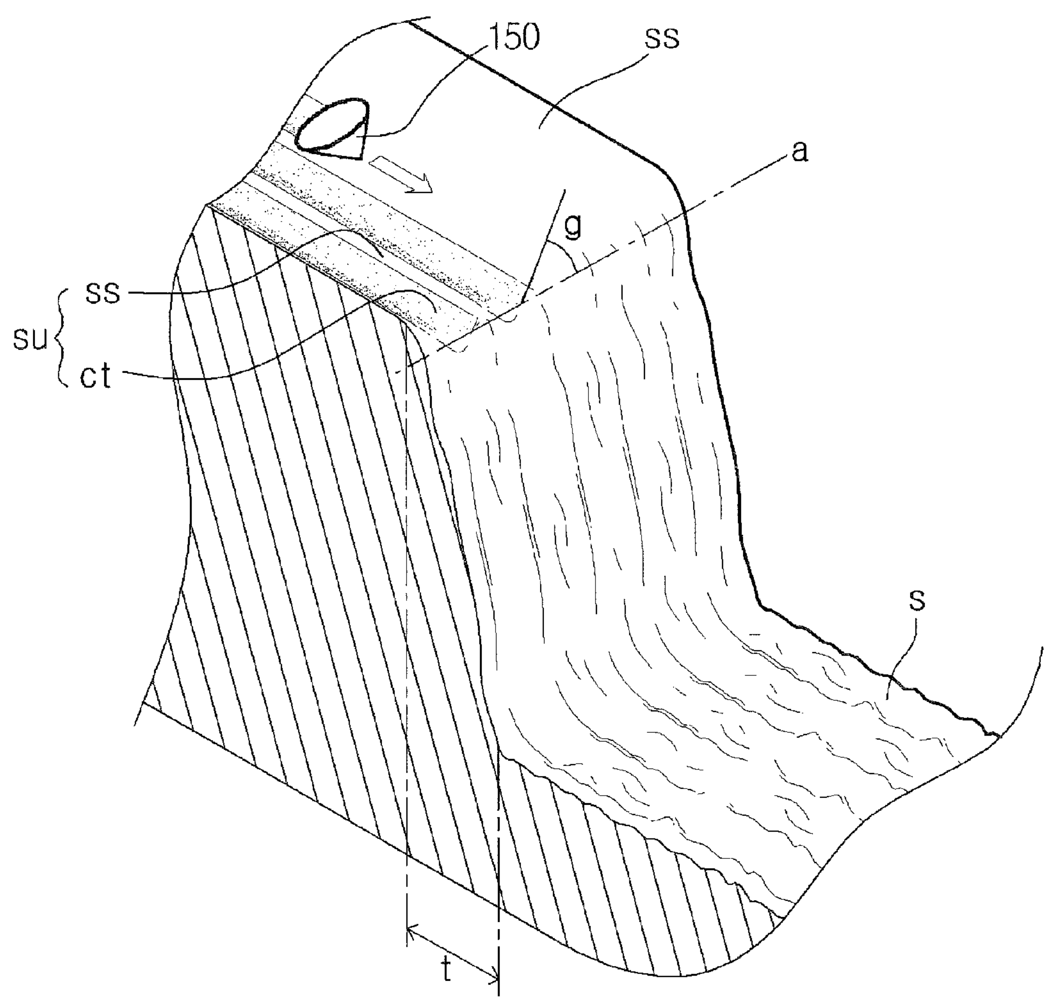

【Figure 7】
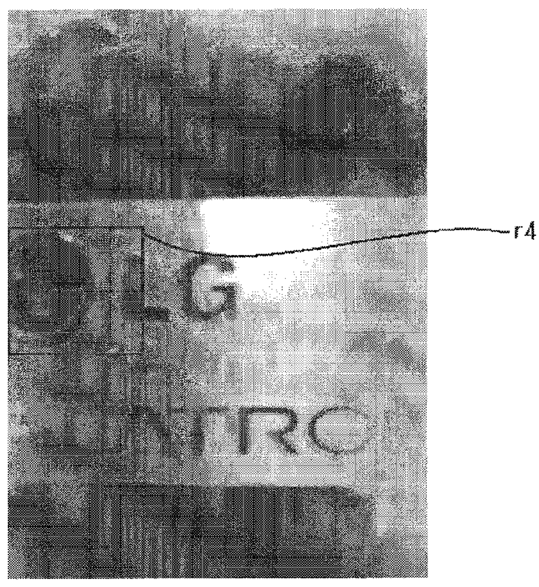
(a)
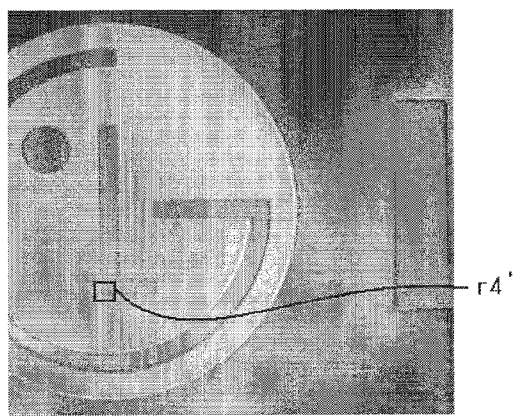
(b)
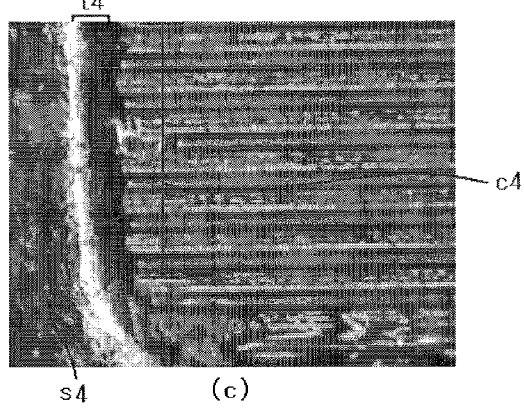
(c)
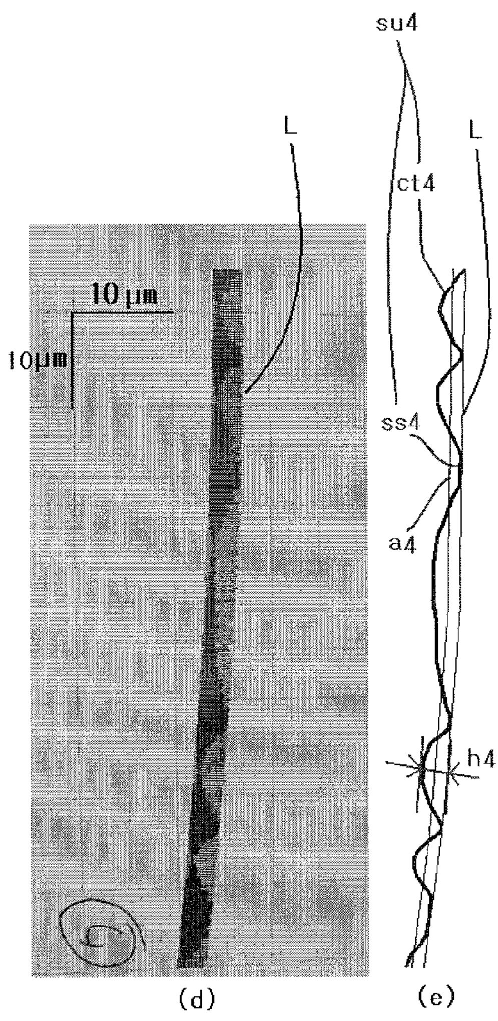
(d)
(e)

【Figure 8】
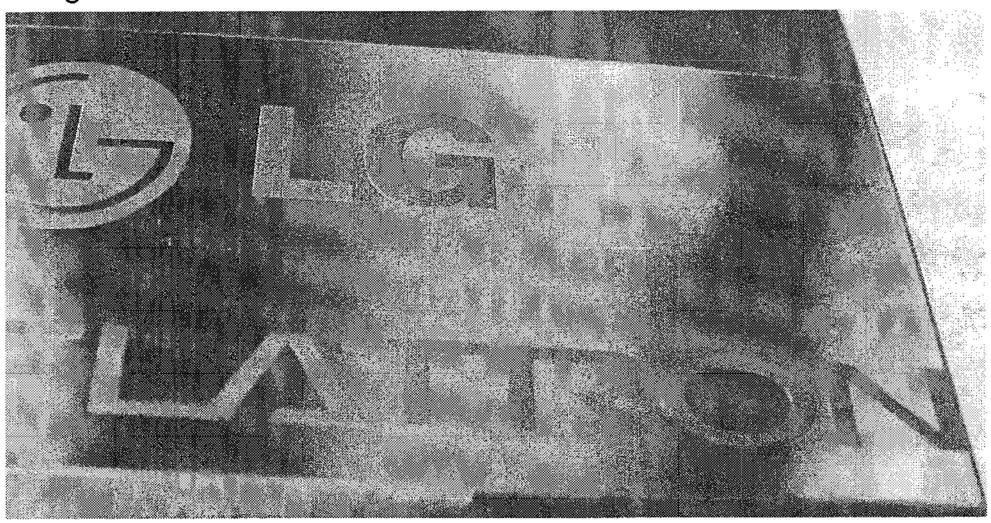

INJECTION MOLDED PRODUCT

TECHNICAL FIELD

The present invention relates to an injection molded product and, more particularly, to an injection molded product manufactured by the injection molding of synthetic resins such as a plastic.

BACKGROUND ART

FIG. 1 illustrates a related injection molded product, and what illustrated in FIG. 1*a* is that a predetermined pattern is formed as printing with ink (the present specification gives a pattern formed with letters as an example) on the injection molded product. However, this case has some disadvantages in that much of costs and time are needed due to the addition of the process for manufacturing cabinets and etc used for various image display device, since the printing process has to be added after the injection molding.

Another injection molded product is illustrated in FIG. 1*b*, and an intaglio pattern "Canon" is formed as illustrated. The injection molded product on which an embossed pattern or an intaglio pattern are formed does not need a separate printing process as different from the injection molded product illustrated in FIG. 1*a*. However, the intaglio pattern or embossed pattern is not beautiful and is regarded as weary, since it has been used for a long time, and because of this, the demands for injection molded products on which new patterns are formed has been raised in the related industry.

Starting the above-mentioned demands, the subject about forming patterns with any other method on the same plane excepting printing was raised, and the method forming patterns as etched was examined. FIG. 2 illustrates an injection molded material which is injection molded by a mold that the surface is treated as etched.

FIG. 2*a* is a photograph taken as the real size, FIG. 2*b* is a photograph that the a portion r1 of FIG. 2*a* is taken as magnified 600 times, and FIG. 2*c* is a result of measuring prominence as cutting off along the line c1 in FIG. 2*a* (progressing speed of a measuring instrument is 0.3 mm/s, and the measuring cut off is 0.8 mm). For further reference, the line marked a1 is the line corresponding to the average height of the prominence of represented part w1.

As a result of measuring the part w1 which is wide enough to secure the representing quality on the surface s1, the arithmetic average roughness of the prominence is about 9.154 μm, and the average thickness is about 200 μm.

However, the straight quality of the boundary is reduced due to the thickness of the prominence when the boundary of pattern is formed on the surface of the injection molded product due to the surface on which thick prominence as above is formed and the even surface (surface almost reflecting objects) that is in the limelight recently, therefore, the external appearance cannot be beautiful.

DISCLOSURE

Technical Problem

The present invention is contrived to overcome the above-mentioned disadvantage, and an object of the present invention is to provide an injection molded product that a beautiful pattern which is not required with any separate processes after the injection molding is formed on the surface.

Technical Solution

In order to achieve the above-mentioned object, there is provided a pattern according to the regularity of the prominence on the surface of the injection molded product as dividing the surface of the injection molded product into a surface of irregular prominence and a surface of regular prominence.

ADVANTAGEOUS EFFECTS

According to the present invention, there is provided an injection molded product on which a beautiful pattern that the any separate process after the injection molding is not required is formed.

Further, there is provided an injection molded product reflecting natural color similar to hologram in accordance with the angles of lights.

DESCRIPTION OF DRAWINGS

FIG. 1 is a photograph illustrating a related injection molded product on which a pattern is formed.

FIG. 2 is a photograph illustrating an injection molded product on which the related thick prominence is formed, FIG. 3 is a schematic diagram illustrating a preferred embodiment of a system for injection molding.

FIG. 4 is a cross-sectional view illustrating a mold used for manufacturing the injection molded products according to the present invention.

FIGS. 5 and 6 are schematic diagrams illustrating the process of manufacturing a mold used for manufacturing the injection molded product according to the present invention.

FIG. 7 is a photograph illustrating an example of an injection molded product according to the present invention.

FIG. 8 is a photograph illustrating the reflected light of an injection molded product according to the present invention.

BEST MODE

In order to achieve the above-mentioned objects, the present invention provides an injection molded product comprising an irregular prominent surface that irregular prominence is formed; and a regular prominent surface formed by minute protrusion which is a type of lines; and a pattern formed by the difference of regularity between the irregular prominent surface and the regular prominent surface.

It is proper for the height of the minute protrusions to be within 1 μm to 5 μm, and it is proper for the width of the minute protrusions to be within 7 μm to 9 μm.

It is proper that a highly even surface is inter-positioned among the minute protrusions, and it is proper for the width of the highly even surface to be 1 μm to 3 μm.

It is proper for the arithmetic mean deviation of the profile of the surface of the regular prominence to be 0.709 μm to 1.709 μm, and it is proper for the average side angle of the minute protrusions against the average of the surface of the regular prominence to be 25 degrees to 30 degrees.

It is proper for the arithmetic mean deviation of the profile of the highly even surface to be 0.012 μm to 0.073 μm, and it is proper for the arithmetic mean deviation of the profile of the irregular prominent surface to be 0.158 μm to 7.428 μm.

It is proper for the average height of the irregular prominent surface to be 1 μm to 100 μm with the average of the regular prominent surface as a standard at the boundary of the regular prominent surface and the irregular prominent surface.

MODE FOR INVENTION

As the injection molded product according to the present invention is manufactured by a mold for injection molding, reference will now be made in detail as for the mold for injection molding with reference to FIGS. 3 to 6. FIG. 3 illustrates the principle parts of the injection molding system using the injection molding mold according to the present invention. The melting liquid supply unit 11 is a means storing the melting fluid 11*a* and supplying it to the mold, and synthetic resins such as polycarbonate, High-Impact Polystyrene HIPS and ABS resin are applicable for the melting liquid 11*a*.

The upper mold core 14 and the lower mold core 16 are the elements deciding the external form of the injection molding products, and the melting liquid is supplied to the space between them. As the upper mold 13 and the lower mold 17 are what heats and refrigerates the upper mold core 14 and the lower mold core 16, each of supply pipes 13*a* and 17*a* are formed in the inside of them, and air and gaseous fuel are supplied through the pipes from the air and gaseous fuel supply device 18.

As illustrated, the upper mold core 14 and the lower mold core 16 may be heated as the injected air and gaseous fuel ignite, and the time taken for the injection molding process can be greatly reduced. Though it is not illustrated in FIG. 3, a refrigerating path may be formed in the upper mold core 14 and the lower mold core 16, and the refrigeration can be faster, the time taken for the injection molding process can be greatly reduced, and the surface of the injection molding product 15 can be highly even when a refrigerating liquid including air flows through the refrigerating path. As the un-described reference numerals 15*a* is a portion of the injection molding product hardened in the passage of the melting liquid, it is usual to remove the portion in the injection molding process.

Each of the reference numerals 13, 14, 16 and 17 is described as an upper mold, an upper mold core, a lower mold core and a lower mold, however, the element directly deciding the external form, especially the surface, of the injection molded product will be called as a mold on the following. Therefore, the upper mold core 14 and the lower mold core 16 in FIG. 3 are molds, and the lower mold core 16 in FIG. 3 will be provided as an example on the following.

On the other hand, the injection molded product according to the present invention is not only manufactured by the injection molding system configured as above but is also possible to be manufactured by other injection molding systems.

FIG. 4 illustrates a mold 100 used for manufacturing injection molded products according to the present invention, and it is corresponded to the lower mold core 16 in FIG. 3. As illustrated in FIG. 4, the mold 100 includes a contact surface 101 contacting the supplied melting liquid and a non-contact surface 102 that doesn't contact the melting liquid, and the contact surface 101 includes a regular prominent contact surface SU and the irregular prominent contact surface S.

The regular prominent contact surface SU is formed by fan-shaped minute grooves CT, and the fan-shaped minute grove is formed as lengthily dug by a cutting means 150 illustrated in FIG. 6 from a highly even contact surface SS upon the whole at first time. A highly even contact surface SS of before cut may be positioned among the fan-shaped minute grooves CT in accordance with the performance condition of the cutting process. On one hand, the irregular prominent contact surface S may be formed by etched or sand blasted.

The highly even contact surface SS is a part for the corresponded injection molded product to be formed as a highly even contact surface, and the arithmetic mean deviation of the profile is 0.012 μm to 0.073 μm. To form a highly even surface reflecting objects as a mirror on the injection molded product with the highly even contact surface SS, there has to be secured an arithmetic mean deviation of the profile less than 0.073 μm, and the value of the arithmetic mean deviation of the profile is the lower, the better, but the value of the arithmetic mean deviation of the profile lower than 0.012 μm is not required much, since it is technically hard and the difference is not discerned by human eyes.

Further, the irregular prominent contact surface S is a surface formed by sand blasted or etched, and the arithmetic mean deviation of the profile is 0.158 μm to 7.428 μm When the irregular prominent surface is formed by sand blasted, the arithmetic mean deviation of the profile of the irregular prominent surface is greatly affected by the sizes of the particles and etc used for the sand blasting method. The size of the particle used in the present preferred embodiment is 0.05 μm to 1.374 μm, and accordingly the arithmetic mean deviation of the profile is obtained as 0.0158 μm to 1.374.

It is a matter of course for the irregular prominent contact surface S to have an arithmetic mean deviation of the profile exceeding 1.374 μm by sand blasted, however, the present preferred embodiment used etching method for the irregular prominent contact surface S to have an arithmetic mean deviation of the profile exceeding 1.374 μm to 7.428 μm. It takes much time and costs in sand blasting for the irregular prominent surface S to have an arithmetic mean deviation of the profile less than 0.158 μm.

When the irregular prominent contact surface is formed by etched, there is a problem that it is hard for the arithmetic mean deviation of the profile of the irregular prominent contact surface to be less than 1 μm as some parts are not etched well, and the external appearance is not beautiful when the value becomes more than 7.428 μm.

It is provided on the arithmetic mean deviation of the profile in KS B 0161 of the Korean Standards, and it is equivalent to the height of a rectangular form of dimension that is the same to the grand total of the area of all protrusions and depressions of the roughness curve—the sectional curve on the surface, and the arithmetic mean deviation of the profile is an arithmetic average of the declination of the roughness curve against the average corresponding to the height statistically.

The arithmetic mean deviation of the profile of the regular prominent contact surface SU is 0.709 μm to 1.611 μm.

The pattern on the injection molded product according to the present invention is formed in accordance with the existence and the nonexistence of the regularity of the surface, and it will be described in detail as for the minute groove ct which is different to the irregular prominent contact surface S formed without a regularity, giving the fan-shaped regularity to the surface of the injection molded product.

The depth h of the fan-shaped minute grooves ct is 1 μm to 5 μm, when the depth is lower than 1 μm, the fan-shaped minute grooves are not formed clearly, and when the depth is higher than 5 μm the prominent contact surface su is not beautiful.

A boundary t is formed between the regular prominent contact surface su and the irregular prominent contact surface s due to their regularity of them, and a predetermined pattern is formed on the contact surface 101 due to the boundary, and it is directly expressed on the injection molded products manufactured by the mold 100.

The height H of the average a of the regular prominent contact surface with the average (it is not indicated in FIG. 4, since the actual profile to be indicated separately is little) of the irregular prominent contact surface s is 1 μm~100 μm, and here, 1 μm is a numerical value which is hard to be lowered more, and 100 μm is corresponding to the maximum height that human cannot feel the height difference with their eyesight.

Reference will now be made in detail as for the manufacturing process of the mold 100 as referring to FIGS. 5 to 6, but the description will be focused on the upper part of the mold 100 illustrated in a of FIG. 5, since it is the part that will be the contact surface 101. The upper part of the mold 100 is processed upon the whole as a highly even contact surface SS at first. As giving a detail, the machining such as NC, end milling and etc are performed for the first, the surface is ground by an oil stone from bigger particle to smaller particle, and the surface is polished by a smooth absorbent cotton with compound on. The polishing process is performed as using absorbent cottons of bigger particle to smaller particle, and it is proper for experts to polish the surface as directly feeling with their hands at the final step.

The upper side of the processed mold has an arithmetic mean deviation of the profile of 0.012 μm to 0.073 μm, and a in FIG. 5 illustrates the cross section of a mold 100 that the process is completed.

A film 110 on which a transcription material 120 is attached as a predetermined pattern (which will be a highly even contact surface SS) is closely adhered on the highly even contact surface SS which is formed upon the whole (b in FIG. 5). Then, the film is removed after applying and adhering the transcription material 120 on the highly even contact surface SS as throwing light of a predetermined wavelength toward the transcription material or as heating the transcription material with a predetermined temperature (c in FIG. 5). As giving an example, Viasol is applicable for the transcription material, and it is transcribed with ultra violet rays. After that, the irregular prominent contact surface S is formed as the uncovered part is evenly carved by the transcription material 120 performed as a mask when the sand blasting or etching process is performed toward the upper surface of the mold 100 (d in FIG. 5). The height difference H between the average line "a" of the regular prominent contact surface S and the average line of the irregular prominent contact surface may be controlled with the way of sandblasting or etching.

The highly even contact surface SS and the irregular contact surface s are remained when the transcription material 120 is washed off with a cleaning solution and etc after sand blasting or etching (e in FIG. 5).

Then the cutting process illustrated in FIG. 6 is performed. The cutting means 150 in FIG. 6 is, for example, an industrial diamond forms fan-shaped minute grooves ct on the highly even contact surface SS as performing the process toward the arrow.

An average side angle "g" of the fan-shaped minute grooves against the average line of the regular prominent contact surface SU is illustrated in FIG. 6, and it may be decided within the range of 25 degrees to 30 degrees in accordance with the section of the cutting means. The angle "g" is the same to the average side angle of the fan-shaped minute protrusion ct4 against the average line a4 of the regular prominent surface su4 on the injection molded material (refer to e in FIG. 7).

As each of the above steps is performed, an injection molding mold 100 having a contact surface on which a pattern is formed by the boundary t of the irregular prominent contact surface s and the regular prominent contact surface SU is completed.

Reference will now be made in details as for an injection molded material according to a preferred embodiment manufactured by a mold 100 with reference to FIG. 7.

FIG. 7*a* is a photograph that the surface of a molded material is photographed in the real size, FIG. 7*b* is a photograph that a part r4 of FIG. 7*a* as magnified 10 times, FIG. 7*c* is a photograph that a part r4 of FIG. 7*b* as magnified 60 times, FIG. 7*d* is a result of measuring the prominence as cutting along the line c4 in FIG. 7*c* (the progressing speed of the measuring device is 0.3 mm/s, and the measuring cut off is 0.8 mm), and FIG. 7*e* is a view illustrating the outline of FIG. D for the description.

The measuring standard line L is illustrated as a little curved in FIGS. 7*d* and 7*e*, but it is only a small error of the measuring device. Further, there has to be 6.5 pieces of fan-shaped minute protrusions ct4 of the injection molded product corresponding to the fan-shaped minute grooves ct of the mold, however it is not illustrated well in FIGS. 7*d* and 7*e*, since the two in the middle are adhered to each other by a small error at the cutting process. The small errors at the cutting process don't cause serious problems as it is shown in FIGS. 7*a* to 7*c*.

Referring to FIG. 7*c* showing the surface of the injection molded product in detail, the irregular prominent surface s4 of the injection molded product formed the irregular prominent contact surface S and the regular prominent surface su4 formed by the regular prominent contact surface SU adjacent to the irregular prominent surface s4 are illustrated. As illustrated, the irregular prominent surface s4 and the regular prominent surface su4 are divided clearly by the boundary t4, and it is because of the regularity difference of the surfaces. The boundary t4 of the injection molded product corresponds to the boundary t of the mold 100.

The fan-shaped minute protrusions ct4 formed by the fan-shaped minute grooves ct of the mold are formed on the regular prominent surface su4, and a highly even surface ss4 is inter-positioned between them. The views show that the width of the fan-shaped minute protrusions is 7 μm to 9 μm, and the width of the highly even contact surface is 1 μm to 3 μm.

The arithmetic mean deviation of the profile of the regular prominent surface su4 of the injection molded product is indicated as 0.809 μm on the illustrated injection molded product, however, this value may be controlled to be 0.709 μm to 1.611 μm in accordance with its necessity.

The arithmetic mean deviation of the profile of the irregular prominent surface s4 of the injection molded product formed by the irregular prominent contact surface S of the mold 100 is shown as 0.158 μm, however, the value may be controlled to be 0.158 μm to 7.428 μm in accordance with the blasted condition or the etched condition without any remarkable increase of costs and time.

As a reference, the line indicated as a4 is the average line of the regular prominent surface su4, the line h4 is the height ct4 of the fan-shaped minute protrusion corresponding to the depth h of the fan-shaped minute groove of the mold 100, and the height is shown as 3 μm in FIGS. 7*d* to 7*e*, however, it may be controlled to be 1 μm to 5 μm in accordance with the performance method of the cutting process without any remarkable increase of costs and time.

FIG. 8 illustrates a photo of an injecting molded product, and a light of natural color similar to a hologram is reflected in accordance with the angle of lights at the regular prominent surface su4 of the injection molded product formed by a regular prominent contact surface su of a mold 100 as it is shown in the views. It is a thing that is not shown on the surfaces of related injection molded products, but is only expressed on the injection molded product injection molded by the mold of the present invention, and the production of the reflected light of natural color seems to be produced by the fan-shaped minute protrusions st4 illustrated in FIG. 7 and by the highly even surface ss4 between the fan-shaped minute protrusions st4 illustrated in FIG. 7.

The numerical values indicated in the unit of μm are measured with the injection molded product as a standard for the convenience of measurement, therefore, there may be a small difference from the real numerical value such as an error related to an injection molding process, for example, the contraction rate of 0.3% by the refrigerated contraction after the injection molding.

The present invention is described with reference to the preferred embodiment illustrated in views, however, it is only a preferred embodiment, and anyone who has the regular knowledge in the field of the present art can revise the invention and can provide other equal preferred embodiments. Therefore, the real protection boundary of the present invention should be defined by the technical idea of the accompanying claims.

Industrial Applicability

The present invention is applicable for various kinds of injection molded products manufactured with synthetic resins.

The invention claimed is:

1. An injection molded product, comprising:

an irregular prominent surface on which a plurality of irregular prominences is formed; and a regular prominent surface that includes a plurality of fan-shaped minute protrusions, wherein a pattern is formed by a difference of a regularity between the irregular prominent surface and the regular prominent surface, and wherein a plurality of highly even surfaces is interposed between the plurality of fan-shaped minute protrusions.

2. The injection molded product according to claim 1, wherein a height of the plurality of fan-shaped minute protrusions is 1 μm to 5 μm.

3. The injection molded product according to claim 2, wherein a width of the plurality of fan-shaped protrusions is 7 μm to 9 μm.

4. The injection molded product according to claim 1, wherein a width of the plurality of highly even surfaces is 1 μm to 3 μm.

5. The injection molded product according to claim 4, wherein an arithmetic mean deviation of a profile of the regular prominent surface is 0.709 μm to 1.611 μm.

6. The injection molded product according to claim 5, wherein an average side angle of the plurality of fan-shaped minute protrusions against an average line of the regular prominent surface is 25 to 30 degrees.

7. The injection molded product according to claim 6, wherein an arithmetic mean deviation of a profile of the plurality of highly even surfaces is 0.012 μm to 0.073 μm.

8. The injection molded product according to claim 7, wherein an arithmetic mean deviation of a profile of the irregular prominent surface is 0.158 μm to 7.428 μm.

9. The injection molded product according to claim 1, wherein a height of an average line of the irregular prominent surface is 1 μm to 100 μm with an average line of the regular prominent surface at a boundary of the regular prominent surface and the irregular prominent surface as a reference.

10. A method of manufacturing the injection molded product of claim 1, the method comprising:

providing at least one mold comprising a contact surface, the contact surface comprising:

an irregular prominent surface on which a plurality of irregular prominences is formed; and a regular prominent surface that includes a plurality of fan-shaped minute grooves, wherein a pattern is formed by a difference of a regularity between the irregular prominent surface and the regular prominent surface, and wherein a plurality of highly even surfaces is interposed between the plurality of fan-shaped minute grooves; and injecting a molding material into the at least one mold to form the injection molded product.

* * * * *